Dec. 23, 1941.  E. D. THORNE  2,267,539
MEASURING INSTRUMENT
Filed Oct. 31, 1939
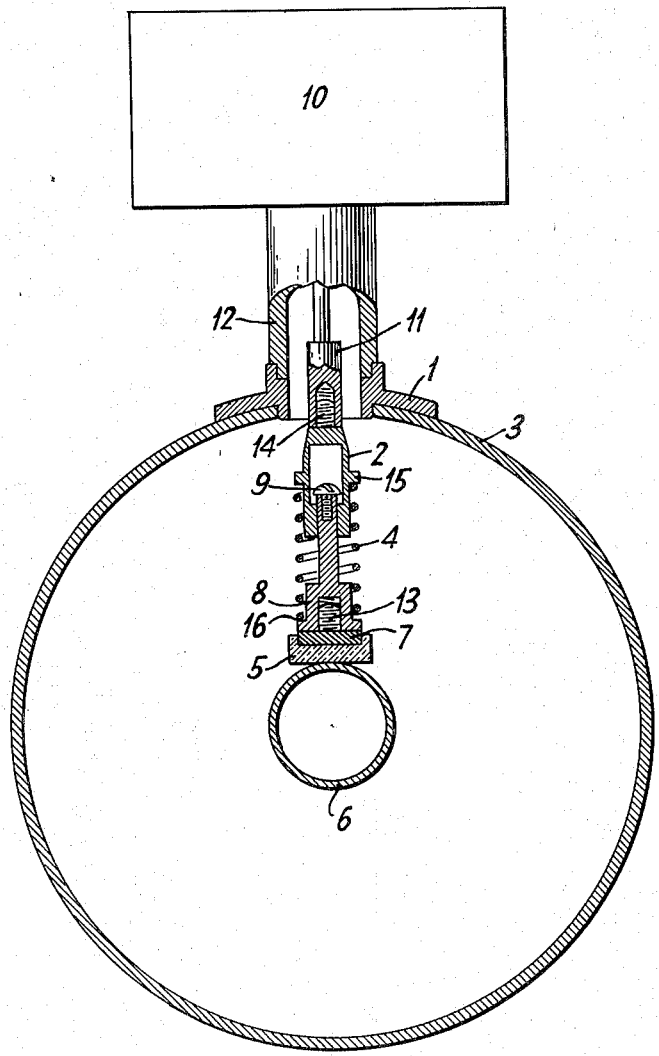
INVENTOR
E. DAYTON THORNE
BY H.S. Snover
ATTORNEY Patented Dec. 23, 1941

2,267,539

UNITED STATES PATENT OFFICE 2,267,539

MEASURING INSTRUMENT

Earle Dayton Thorne, Patchogue, N. Y., assignor to Radio Corporation of America, a corporation of Delaware Application October 31, 1939, Serial No. 302,083

13 Claims. (Cl. 175—183)

The present invention relates generally to measuring instruments, and particularly to an instrument adapted to measure the voltage or current on a coaxial line.

One of the objects of the present invention is to provide a measuring instrument for use on a coaxial transmission line which insures accurate relative meter readings.

Another object is to provide a probe for a measuring instrument which provides constant spacing between the inner conductor of a coaxial line and the probe.

Measuring instruments having probes for measuring energy values in a coaxial line are known in the art. It has been customary to employ a probe which is inserted within the outer conductor of the coaxial line and whose end is entirely free from the inner conductor. The current measured by the instrument will thus depend on the line voltage and on the spacing between the probe and the inner conductor of the line. This spacing between the probe and the inner conductor will, in effect, constitute a capacity whose impedance in series with the measuring device is a factor which determines the reading of the instrument. One such instrument known in the art is described in United States Patent No. 2,106,713, granted February 1, 1938, to A. E. Bowen.

One difficulty heretofore experienced in making measurements with such known devices has been caused by imperfections in the coaxial line by reason of which the inner conductor of the coaxial line is not always positioned exactly in the center. Small departures from accurate coaxiality of the conductors of the line will thus cause small changes in the spacing of the probe from the inner conductor with resulting erratic and unreliable meter readings on the measuring instrument. The present invention overcomes the foregoing difficulty.

A more detailed description of the invention follows in conjunction with a drawing, whose single figure illustrates a simplified measuring instrument in accordance with the present invention, applied for measuring purposes to a coaxial or concentric transmission line.

Referring to the drawing in more detail, there is shown, in section, a coaxial transmission line adapted to carry high frequency energy and having an outer conductor 3 and an inner conductor 6. The outer conductor 3 is provided at one or more points in its length with apertures in the form of one or more holes of suitable size through which a probe of the measuring instrument of the invention may be inserted. Around these holes there is shown provided a suitable metallic bushing 1, which, if desired, may be in the form of tracks or ways for assuring contact with one terminal of the measuring instrument. The measuring instrument is indicated generally by box 10 and may consist of any suitable type of meter, such as a thermocouple, rectifier unit, vacuum tube meter, or any other device suitable for measuring the voltage or current on the line. The measuring instrument 10 is shown connected to a pair of concentric conductors 11 and 12, the former threadedly engaging a screw 14 of the probe to be inserted within the outer conductor 3, while conductor 12 engages the metallic bushing 1 for contacting the outer conductor 3. The probe of the measuring instrument comprises, in effect, a hollow stationary stem 2 having a screw 14 for securing the probe to the conductor 11, a capacity metallic pick-up button 7 which is screwed by means of element 13 into a movable stem 8, the latter of which has a sliding fit in the interior of the hollow stem 2, an insulating spacer 5 which is glued or molded to the bottom of the pick-up button 7, and a spring 4 for holding the insulating bushing 5 against the inner conductor. Spring 4 is adapted to surround the lower portion of the element 2 and to engage at its upper end a flange 15 projecting from the element 2, while the lower end of the spring 4 surrounds the lower end of movable stem 8 and engages a shoulder 16. The movable stem 8 is prevented from falling out of element 2 by means of machine screw 9, which screws into the top of the movable stem and whose head is larger than the aperture in the lower portion of the stem 2 in which element 8 moves, as shown. It will thus be apparent that the spring 4 continuously exerts a downward pressure on the movable stem 8 with its associated pick-up button 7 and insulator spacer 5. This spacer 5 may be of any desired thickness, in order to obtain a desired amount of energy pick-up from the inner conductor 6. Metallic bushing 1, in engagement with outer conductor 3 and with conductor 12, thus forms in effect one terminal of the measuring instrument, while conductor 11 and the probe assembly form the other terminal. Conductors 11 and 12 may be connected to the voltmeter 10 in any desired fashion, such as by being screwed into the head or socket of the voltmeter in a manner which maintains the bushing 1 and the probe 2, 8, 7 electrically separated.

The hole in the outer conductor 3 and metallic bushing 1 is of such size as to enable easy insertion of the probe of the measuring instrument into the interior of the coaxial line. The thickness of the insulation 5 maintains a definite spacing between the probe and the inner conductor 6. It will thus be obvious that no matter what the irregularities or imperfections of the coaxial line are, the probe will always engage the inner conductor and the spacing between the lower end of the probe and the inner conductor will be the same at all points in the line, the insulator 5 preventing the probe from making direct conductive connection with the inner conductor, thus insulating the measuring instrument from the high transmission line voltage, and insuring a constant spacing between the inner conductor and the probe, thus assuring accurate readings on the instrument.

It will be understood, of course, that the invention is not limited to the precise arrangements of parts shown, since various modifications may be made without departing from the spirit and scope of the invention.

What is claimed is:

1. In a measuring instrument, a probe having a movable portion and means exerting outward pressure on said movable portion, said movable portion being in all positions in electrical contact with said instrument, said probe constituting one terminal of said instrument, and a metallic tubular element surrounding at least the upper portion of said probe and constituting the other terminal of said instrument.

2. In a measuring instrument, a probe having a movable portion, and resilient means exerting outward pressure on one end of said movable portion, said movable portion being in all positions in electrical contact with said instrument, said probe constituting one terminal of said instrument, and a metallic tubular element surrounding at least the upper portion of said probe and constituting the other terminal of said instrument.

3. In a measuring instrument, a probe having a stationary metallic hollow guide element, a portion movable within said hollow guide element, a spring normally surrounding said movable portion over the greater part of its length and engaging at one end said guide element and at its other end said movable portion, said spring exerting continuous pressure on said movable portion, said movable portion being in all positions in electrical contact with said guide element.

4. In a measuring instrument, a probe having a movable portion, an insulating bushing at the end of said movable portion for engagement with the element carrying the energy to be measured, and means exerting outward pressure on said movable portion, said movable portion being in all positions in electrical contact with said instrument, said probe constituting one terminal of said instrument, and a metallic tubular element surrounding at least the upper portion of said probe and constituting the other terminal of said instrument.

5. A measuring instrument having a pair of coaxial conductors functioning as terminal members, the inner conductors of said pair being longer than the other conductor and constituting a probe, said probe having a stationary element at its upper end and a member at its lower end in electrical contact with said stationary element and slidable relative thereto, and resilient means engaging both said stationary and sliding members and exerting continuous outward pressure on said sliding member, said slidable member being in all positions in electrical contact with said stationary element.

6. A measuring instrument having a pair of coaxial conductors functioning as terminal members, the inner conductor of said pair being longer than the other conductor and constituting a probe, said probe having a stationary element at its upper end and a member at its lower end in electrical contact with said stationary element and slidable relative thereto, and resilient means engaging both said stationary and sliding members and exerting continuous outward pressure on said sliding member, said slidable member having at its lower end an insulator covering its lower surface for separating said probe from direct electrical contact with the element carrying the energy to be measured.

7. In combination, a measuring instrument, a coaxial transmission line carrying high frequency energy, said line having in its outer conductor an aperture for accommodating the probe of said measuring instrument, a metallic terminal element for said instrument located in proximity to said aperture, said probe forming the other terminal for said measuring instrument and comprising a stationary portion at its end near said aperture and a movable portion at its lower end, said movable portion being in electrical contact with said stationary portion and in mechanical engagement with the inner conductor of said coaxial line.

8. In combination, a measuring instrument, a coaxial transmission line carrying high frequency energy, said line having in its outer conductor an aperture for accommodating the probe of said measuring instrument, a metallic terminal element for said instrument located in proximity to said aperture, said probe forming the other terminal for said measuring instrument and comprising a stationary portion at its end near said aperture and a movable portion at its lower end, resilient means exerting continuous outward pressure on said movable portion, an insulator at the lower end of said movable portion, said movable portion being in electrical contact with said stationary portion and said insulator being in contact with the inner conductor of said coaxial line.

9. In a measuring instrument for a coaxial transmission line, a metallic probe having a stationary portion and a movable portion, said last portion being adapted to engage the inner conductor of said line, said movable portion being in all positions in electrical contact with said stationary portion, and a spring exerting continuous outward pressure on said movable portion, said probe constituting one terminal of said instrument, and a metallic tubular element surrounding at least the upper portion of said probe and constituting the other terminal of said instrument.

10. In combination, a measuring instrument having a probe, a coaxial transmission line carrying high frequency energy, and having in its outer conductor an aperture for accommodating the probe of said instrument, said probe comprising one terminal of said instrument, a conductor surrounding said probe and comprising the other terminal of said instrument, means located on the outer conductor of said transmission line near said aperture for assuring electrical contact between the outer conductor of said transmission line and the last terminal of said instrument, said probe having a movable portion at its lower end and resilient means exerting continuous outward pressure on said movable portion for assuring the engagement of said probe with the inner conductor of said transmission line.

11. A combination in accordance with claim 10, characterized in this that the means located on the outer conductor of the transmission line for assuring electrical contact between the outer conductor and one terminal of the instrument comprises metallic tracks.

12. In combination, a measuring instrument having a probe, a coaxial transmission line carrying high frequency energy and having in its outer conductor a plurality of spaced apertures for enabling measurements to be taken along the length of said line, said apertures being sufficiently large to accommodate the probe of said instrument, said probe comprising one terminal of said instrument, a conducor carried by said instrument and surrounding said probe and constituting the other terminal of said instrument, means located on the outer conductor of said transmission line near each of said apertures for assuring electrical contact between the outer conductor of said transmission line and the last terminal of said instrument, said probe having a movable portion at its lower end and resilient means exerting continuous outward pressure on said movable portion for assuring the engagement of said probe with the inner conductor of said transmission line.

13. A measuring instrument having a pair of terminals, one of which is a probe constituted by a stationary metallic hollow guide element and a portion movable within said hollow guide element, a spring surrounding said movable portion and engaging at one end said guide element and at its other end said movable portion, said spring exerting continuous pressure on said movable portion, said movable portion being in all positions in electrical contact with said guide element, the other terminal being a hollow conductor spaced from and surrounding only the stationary guide element of said probe.

EARLE DAYTON THORNE.